United States Patent Office 2,830,992
Patented Apr. 15, 1958

2,830,992

QUINOLIZINE DERIVATIVES

Arnold Brossi, Otto Schnider, and Max Walter, Basel, Switzerland, assignors to Hoffmann-La Roche Inc., Nutley, N. J., a corporation of New Jersey No Drawing. Application May 18, 1956
Serial No. 585,629

Claims priority, application Switzerland June 3, 1955

7 Claims. (Cl. 260—287)

This invention relates to novel chemical compounds and to novel methods and novel intermediates useful in preparing the same. More particularly, the invention relates to novel compounds of the class consisting of 2-oxo-3-lower alkyl-9,10-methylenedioxy-1,2,3,4,6,7-hexahydro-11b-benzo[a]quinolizine and acid addition salts thereof.

One comprehensive embodiment of the invention can be illustrated graphically in terms of the following flow sheet, wherein the symbol R represents a lower alkyl radical; the symbol X represents a halogen, preferably chlorine or bromine; and the symbol Z represents a lower alkyl radical.

FLOW SHEET

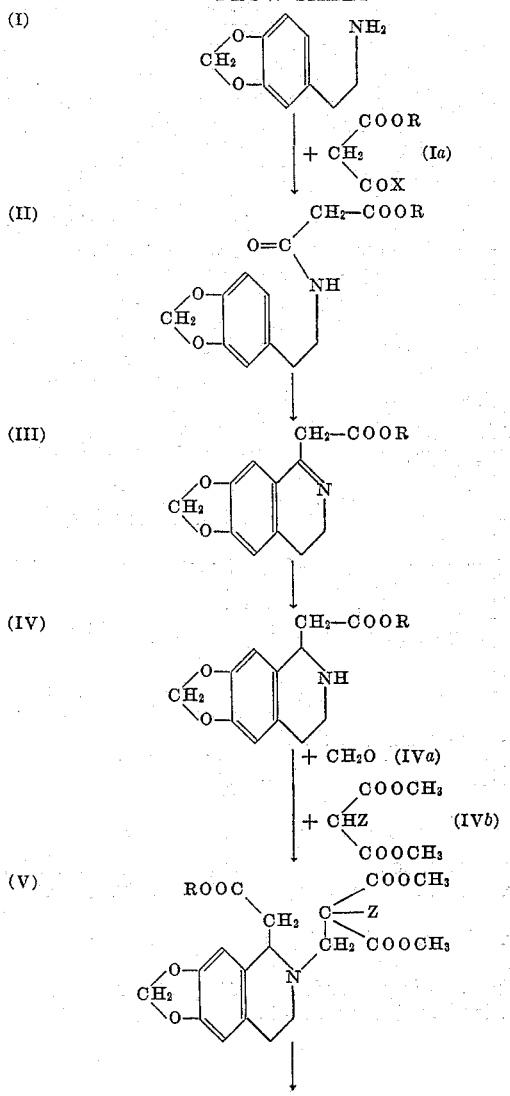

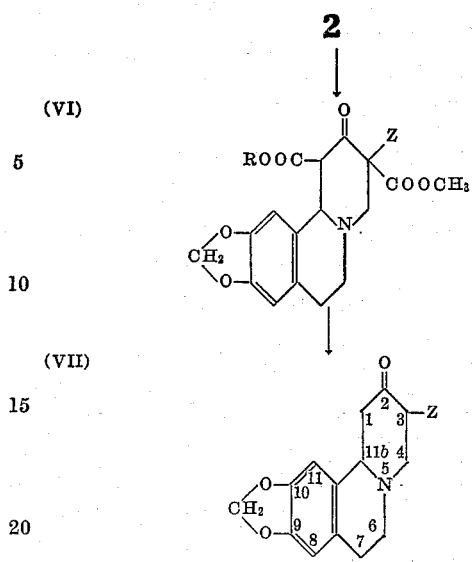

As will be apparent from the flow sheet, the comprehensive embodiment of the invention illustrated therein comprises reacting homopiperonylamine (I) with lower alkoxymalonyl halide (Ia), thereby producing lower alkoxymalonyl-homopiperonylamide (II); cyclizing the latter, thereby producing 1-lower carbalkoxymethyl-6,7-methylenedioxy-3,4-dihydroisoquinoline (III); partially hydrogenating the latter, thereby producing 1-lower carbalkoxymethyl-6,7-methylenedioxy - 1,2,3,4 - tetrahydroisoquinoline (IV); condensing the latter with a member (IVa) of the group consisting of formaldehyde and formaldehyde-yielding substances and with α-lower alkyl-malonic acid dimethyl ester (IVb), thereby producing 1-lower carbalkoxymethyl-2-(2,2-dicarbomethoxy-2-lower alkyl-ethyl)-6,7 - methylenedioxy - 1,2,3,4 - tetrahydroisoquinoline (V); cyclizing the latter, thereby producing 1-lower carbalkoxy-2-oxo-3-carbomethoxy-3-lower alkyl-9,10-methylenedioxy-1,2,3,4,6,7-hexahydro-11b-benzo[a]quinolizine (VI); and hydrolyzing and decarboxylating the latter, thereby producing 2-oxo-3-lower alkyl-9,10-methylenedioxy - 1,2,3,4,6,7 - hexahydro - 11b - benzo[a]quinolizine (VII).

The compounds of Formula VII are bases which form acid addition salts with acids, e. g. with non-toxic acids of the type conventionally employed in the preparation of pharmaceutically acceptable salts of bases; such as strong mineral acids, e. g. hydrochloric acid, sulfuric acid, phosphoric acid, and the like; and organic acids, e. g. acetic acid, citric acid, maleic acid, ethanesulfonic acid, and the like.

A preferred exemplification of the invention provides a process which comprises reacting homopiperonylamine with ethoxymalonyl chloride, thereby producing ethoxymalonyl-homopiperonylamide; heating the latter with phosphorus oxychloride, thereby producing 1-carbethoxymethyl-6,7-methylenedioxy-3,4-dihydroisoquinoline; reacting the latter with one molar proportion of elemental hydrogen in the presence of a hydrogenation catalyst, thereby producing 1-carbethoxymethyl-6,7-methylenedioxy-1,2,3,4-tetrahydroisoquinoline; condensing the latter with a member of the group consisting of formaldehyde and formaldehyde-yielding substances and with α-ethyl-malonic acid dimethyl ester, thereby producing 1-carbethoxymethyl-2-(2,2-dicarbomethoxy-n-butyl) - 6,7 - methylenedioxy-1,2,3,4-tetrahydroisoquinoline; subjecting the latter to Dieckmann cyclization by heating in the presence of an alkaline condensation agent, thereby producing 1-carbethoxy-2-oxo-3-carbomethoxy-3-ethyl - 9,10 - methylenedioxy-1,2,3,4,6,7-hexahydro-11b-benzo[a]quinolizine; and hydrolyzing and decarboxylating the latter by heating with a dilute aqueous solution of a mineral acid, thereby producing 2-oxo-3-ethyl-9,10-methylenedioxy-1,2,3,4,6,7-hexahydro-11b-benzo[a]quinolizine.

Compounds of the class consisting of 2-oxo-3-lower alkyl-9,10-methylenedioxy - 1,2,3,4,6,7 - hexahydro - 11b-benzo[a]quinolizine and acid addition salts thereof are useful as medicinals; more particularly, they are useful as analgesic, antipyretic, sedative, anti-inflammatory and hypotensive compounds.

The invention is further disclosed in the following examples, which are illustrative but not limitative thereof. All temperatures are stated in degrees centigrade, uncorrected.

Example 1

83 g. of homopiperonylamine was dissolved in 600 ml. of absolute diethyl ether, and to the solution was added, over the course of an hour, a solution of 38 g. of ethoxymalonyl chloride (alternative nomenclature, malonic acid monoethyl ester acid chloride) in 100 ml. of absolute diethyl ether. Upon completion of the addition, the reaction mixture was refluxed for two hours. 100 ml. of water was then added to the reaction mixture; the whole was shaken and allowed to stratify. The ethereal layer was decanted and the residue was extracted with chloroform. The ethereal layer and the chloroform extract were combined, washed with dilute aqueous hydrochloric acid, then with dilute aqueous sodium hydroxide solution and finally with water. The washed solution was concentrated, and the crystalline residue obtained was recrystallized from a mixture of ethyl acetate and petroleum ether, yielding 55 g. of ethoxymalonyl-homopiperonylamide (alternative nomenclature, malonic acid monoethyl ester homopiperonylamide), M. P. 96°–98°.

Example 2

50 g. of ethoxymalonyl-homopiperonylamide was dissolved in 450 ml. of benzene, then 41 ml. of phosphorous oxychloride was added, and the reaction mixture was heated for five hours at 80° C. The reaction mixture was cooled, ice water was added, and solid potassium carbonate was added to precipitate the base. The precipitated base was taken up in benzene. Upon concentration of the benzene solution there was obtained 23 g. of crystalline residue comprising crude 1-carbethoxymethyl-6,7-methylenedioxy-3,4-dihydroisoquinoline. A sample was recrystallized from ethanol, yielding light yellow prisms having M. P. 144°–146°.

Example 3

21 g. of the crude 1-carbethoxymethyl-6,7-methylenedioxy-3,4-dihydroisoquinoline obtained above was dissolved in 450 ml. of glacial acetic acid and was hydrogenated at room temperature and under a very slight hydrogen overpressure, in the presence of 1 g. of previously reduced platinum oxide hydrogenation catalyst. In three hours, about 2.5 liters of hydrogen was taken up. At the end of this time the catalyst was filtered off. The basic hydrogenation product, recovered from the filtrate, was dissolved in acetone, and the resulting solution was reacted with oxalic acid, yielding 32 g. of 1-carbethoxymethyl-6,7-methylenedioxy-1,2,3,4-tetrahydroisoquinoline oxalate, M. P. 155°–157°. The basic material obtained by alkalinization of the said oxalate was distilled in high vacuo at 145°/0.03 mm. The distillate crystallized spontaneously. The crystalline material was recrystallized from petroleum ether, yielding 1-carbethoxymethyl-6,7-methylenedioxy-1,2,3,4-tetrahydroisoquinoline, M. P. 56°–58°.

Example 4

263 g. of 1-carbethoxymethyl-6,7-methylenedioxy-1,2,3,4-tetrahydroisoquinoline, 35 g. of paraformaldehyde and 160 g. of monoethylmalonic acid dimethyl ester were refluxed in 1000 ml. of methanol for 24 hours. The reaction mixture was taken to dryness, yielding 1-carbethoxymethyl - 2 - (2,2 - dicarbomethoxy - n - butyl) - 6,7 - methylenedioxy - 1,2,3,4 - tetrahydroisoquinoline.

Example 5

28 g. of sodium was dissolved in 650 ml. of absolute ethanol, the solution was concentrated to dryness, and the residue was mixed with 3500 ml. of toluene and 420 g. of 1 - carbethoxymethyl - 2 - (2,2 - dicarbomethoxy - n - butyl) - 6,7 - methylenedioxy - 1,2,3,4 - tetrahydroisoquinoline. The mixture was heated and the methanol resulting from the condensation reaction was distilled off continuously until the boiling point of toluene was reached. The mixture was thereupon refluxed for two hours and then it was concentrated to dryness. The residue was dissolved in 6000 ml. of 3 N hydrochloric acid and was refluxed for 16 hours at 120°, thereby effecting hydrolysis and decarboxylation. Then the reaction mixture was cooled and made alkaline with ammonia, thereby precipitating 2 - oxo - 3 - ethyl - 9,10 - methylenedioxy - 1,2,3,4,6,7-hexahydro-11b-benzo[a]quinolizine. This material, after recrystallization from methanol, had M. P. 147°–149°. Its hydrochloride had M. P. 187°–189°.

We claim:

1. A process which comprises mixing homopiperonylamine with lower alkoxymalonyl halide, thereby producing lower alkoxymalonyl-homopiperonylamide; cyclizing the latter by heating with phosphorus oxychloride, thereby producing 1-lower carbalkoxmethyl-6,7-methylenedioxy-3,4-dihydroisoquinoline; partially hydrogenating the latter by catalytic hydrogenation in the presence of a platinum hydrogenation catalyst, thereby producing 1-lower carbalkoxymethyl - 6,7 - methylenedioxy - 1,2,3,4 - tetrahydroisoquinoline; condensing the latter by heating with a member of the group consisting of formaldehyde and paraformaldehyde and with α-lower alkyl-malonic acid dimethyl ester, thereby producing 1-lower carbalkoxymethyl - 2 - (2,2 - dicarbomethoxy-2-lower alkyl - ethyl)- 6,7 - methylenedioxy - 1,2,3,4 - tetrahydroisoquinoline; cyclizing the latter by heating with an alkali metal alkoxide, thereby producing 1-lower carbalkoxy-2-oxo-3-carbomethoxy - 3 - lower alkyl-9,10-methylenedioxy-1,2,3,4,6,7-hexahydro-11b-benzo[a]quinolizine; and hydrolyzing and decarboxylating the latter by heating with an aqueous solution of a mineral acid, thereby producing 2-oxo-3-lower alkyl-9,10-methylenedioxy - 1,2,3,4,6,7 - hexahydro - 11b-benzol[a]quinolizine.

2. Lower alkoxymalonyl-homopiperonylamide.

3. 1 - lower carbalkoxymethyl-6,7-methylenedioxy - 3,4-dihydroisoquinoline.

4. 1-lower carbalkoxymethyl-6,7-methylenedioxy-1,2,3,4-tetrahydroisoquinoline.

5. 1 - lower carbalkoxymethyl-2-(2,2-dicarbomethoxy-2 - lower alkyl-ethyl)-6,7-methylenedioxy-1,2,3,4-tetrahydroisoquinoline.

6. 1 - lower carbalkoxy - 2 - oxo - 3 - carbomethoxy - 3 - lower alkyl - 9,10 - methylenedioxy - 1,2,3,4,6,7 - hexahydro - 11b - benzo[a]quinolizine.

7. 2-oxo-3-lower alkyl-9,10-methylenedioxy-1,2,3,4,6,7-hexahydro-11b-benzo[a]quinolizine.

References Cited in the file of this patent

Jour. Pharm. Society, Japan (I), vol. 72, 1952, 248–251.

Jour. Pharm. Society, Japan (II), vol. 69, 1949, pp. 85–87.

Jour. Pharm. Society, Japan (III), vol. 62, 1942, pp. 77–82.

J. Chem. Society (London), 1953, pp. 2463–2470.

Experientia, vol. 6, pp. 378–9.